United States Patent
Funk et al.

(10) Patent No.: US 6,553,833 B1
(45) Date of Patent: Apr. 29, 2003

(54) DEVICE FOR BIAS POTENTIAL GENERATION FOR AN OSCILLATING ROTATION SPEED SENSOR

(75) Inventors: Karsten Funk, Palo Alto, CA (US); Reinhard Neul, Stuttgart (DE); Gunar Lorenz, Gerlingen (FR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/830,183
(22) PCT Filed: Aug. 19, 2000
(86) PCT No.: PCT/DE00/02829
§ 371 (c)(1), (2), (4) Date: Apr. 23, 2001
(87) PCT Pub. No.: WO01/14831
PCT Pub. Date: Mar. 1, 2001

(65) Prior Publication Data
(65)
(30) Foreign Application Priority Data

Aug. 24, 1999 (DE) .......................................... 199 39 998

(51) Int. Cl.⁷ ............................. G01P 9/04; G01C 19/00
(52) U.S. Cl. ................................. 73/504.14; 73/504.08; 73/504.12
(58) Field of Search .......................... 73/504.16, 504.15, 73/504.12, 504.13, 504.14, 504.04, 514.32, 1.37, 1.38, 514.16

(56) References Cited
U.S. PATENT DOCUMENTS

| 4,951,508 A | 8/1990 | Loper | |
|---|---|---|---|
| 5,220,836 A | * 6/1993 | Harms et al. | 73/702 |
| 5,481,914 A | 1/1996 | Ward | |
| 5,691,472 A | 11/1997 | Petri | |
| 5,796,002 A | 8/1998 | Layton | |
| 6,298,709 B1 | * 10/2001 | Artzner et al. | 73/1.38 |

FOREIGN PATENT DOCUMENTS

| DE | 196 53 021 A | 12/1996 |
|---|---|---|
| DE | 199 10415 A | 3/1999 |
| EP | 0 298 651 A | 1/1989 |
| WO | 97 45699 A | 12/1997 |

* cited by examiner

Primary Examiner—Helen Kwok
(74) Attorney, Agent, or Firm—Michael J. Striker

(57) ABSTRACT

The invention relates to a device for generating bias voltages for the electrodes of a rotation rate sensor. By evaluating a rotation rate signal and a quadrature signal, control signals are generated, using an adaptive quadrature compensator, that are converted by means of a bias voltage generating arrangement into bias voltages that are delivered to the electrodes of an electrode arrangement disposed underneath the seismic mass or masses of the rotation rate sensor. As a result, the sensor structure can be inclined in such a way that the quadrature signal occurring at the output is minimized. In accordance with a further feature of the invention, the bias voltages generated by the bias voltage generating arrangement are modified, as a function of the output signal of a bandwidth adjusting circuit, in such a way that the amplitude frequency response of the detection motion has a desired bandwidth.

12 Claims, 3 Drawing Sheets

DEVICE FOR BIAS POTENTIAL GENERATION FOR AN OSCILLATING ROTATION SPEED SENSOR

PRIOR ART

Figure 1:
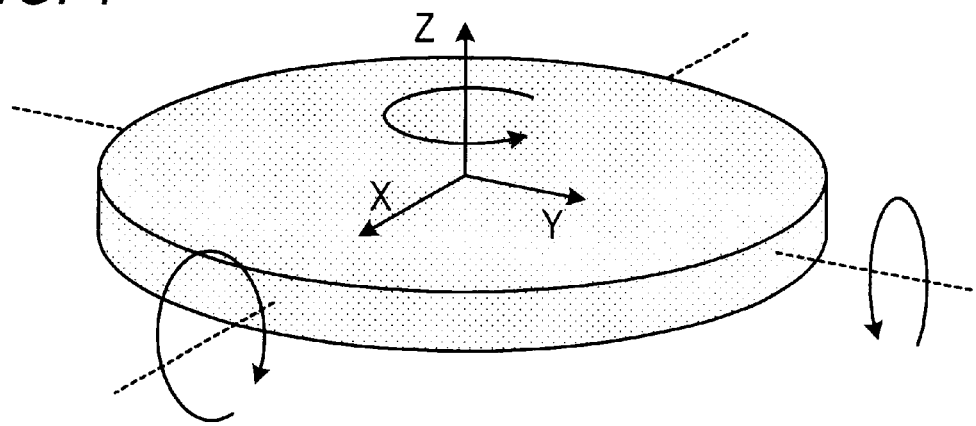

The invention is based on a device for generating bias voltage for a rotationally or linearly vibrating rotation rate sensor.

Rotation rate sensors that utilize the Coriolis effect are known in conjunction with systems in motor vehicles for controlling vehicle dynamics and are put on m the market by the present applicant in the form of micromechanical rotation rate sensors. A rotation rate sensor has one or more seismic masses, which by means of a voltage generated in an electronic circuit is excited to perform mechanical vibration. This vibration acts on one or more acceleration sensors, which upon a rotation of the system measure the Coriolis acceleration acting on the vibrating masses. From the excitation and acceleration signals,,the rotation rate of the system can be determined with the aid of an evaluation circuit.

An additional electrical test signal, which is fed to the acceleration sensor or sensors, can serve to cause an additional, arbitrarily generated acceleration to act on the sensor. Thus information about the properties of the acceleration sensor and the downstream evaluation circuit, for instance, can be obtained. It is accordingly also possible to detect errors, and in particular systematic errors. This is especially important, since rotation rate sensors that evaluate the Coriolis effect exhibit systematic errors, whose effects on the measurement signal must be minimized by a suitable choice of evaluation methods.

In German Patent Disclosure DE 199 10 415, a method and an apparatus for tuning a first oscillator with a second oscillator are described. Two frequency-and phase-shifted signals symmetrical to the vibration of the second oscillator are used to determine the response behavior of the first oscillator. As a function of the difference in response behaviors, tuning of the first oscillator with reference to the second oscillator is performed. For amplitude correction, a quotient is formed from the output signal and the sum of response behaviors. This method and the apparatus can be used in particular in. a rotation rate sensor. They assure that the evaluation conditions for the Coriolis force are stable. Temperature changes and aging effects can also be compensated for automatically; by means of the closed-loop control circuit, the vibrations of the two oscillators can be tuned to one another. The known method makes it no longer necessary to locate the detection mode as far away from the oscillator frequency as possible.

From German Patent Disclosure DE-A 196 53 021, a device for ascertaining a rotation rate with a rotation rate sensor is known, which among other things is a standard for the Coriolis acceleration and thus for the rotation rate as well. The output signals of the rotation rate sensor are pulse width modulated or sigma-Δ signals. These signals are delivered to a digital evaluation circuit, which has a subtractor, a multiplier, and a phase shifter. The phase shifter is supplied with the carrier signal, which excites the rotation rate sensor to vibrate; the digital phase shifter puts the carrier signal in phase with the Coriolis acceleration components, and the associated signal is delivered to the multiplier. The output signal of the multiplier is delivered, via a digital/analog converter and a low-pass filter, to the output, where the desired rotation rate signal is available.

ADVANTAGES OF THE INVENTION

The device according to the invention for generating bias voltage for a rotationally or linearly vibrating rotation rate sensor leads to the advantage that an appearance of a quadrature signal, which could adversely affect the ascertainment of the rotation rate signal, is avoided or at least minimized by a generation of suitable bias voltage signals for the electrode arrangement. On the basis of these bias voltage signals, electrostatic forces occur that act on the rotation rate sensor, which by way of example is constructed in the shape of a disk. By means of these forces, the rotation rate sensor is inclined in such a way that the quadrature signal is minimized. In order to incline the rotation rate sensor in a desired direction, it suffices to predetermine potential differences between the detection electrodes. This can be done by a predetermination of two output signals $U_{Q1}$ and $U_{Q2}$ from the quadrature compensator; these output signals affect the bias voltages fed to the electrodes. To compensate for the quadrature signal when the rotation rate sensor is in rotation, preferably four and in the case of a linear rotation rate sensor at least two electrodes, disposed below the sensor structure, are acted upon by suitable bias voltages.

Further advantages of the device of the invention reside in an improvement of the measurement resolution, and—since the quadrature component is suppressed adaptively—in the fact that aging and temperature dependencies and the necessity for calibration are avoided.

DRAWING

Figure 2:
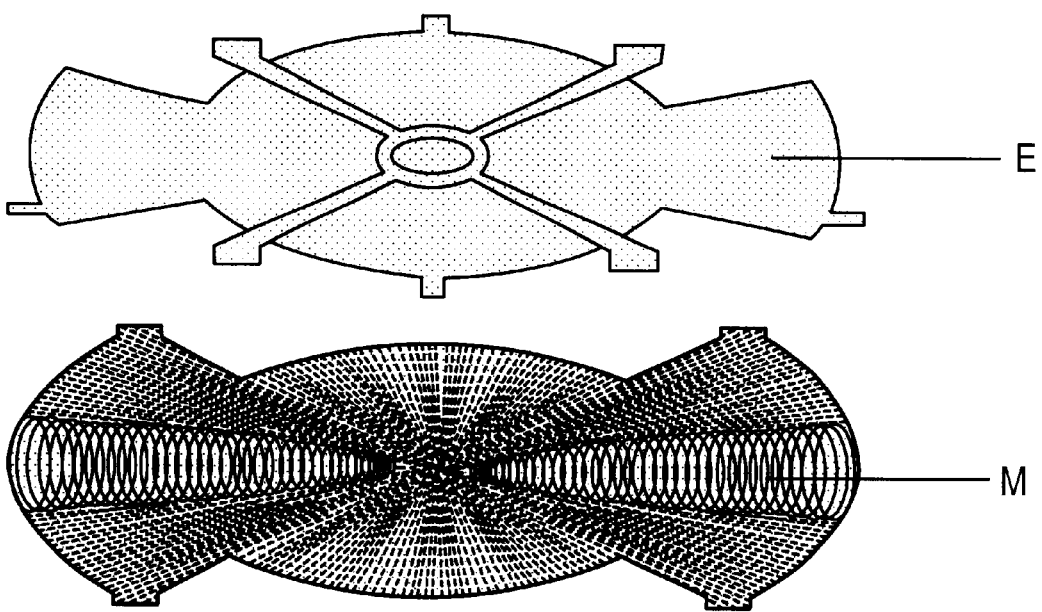
Figure 3:
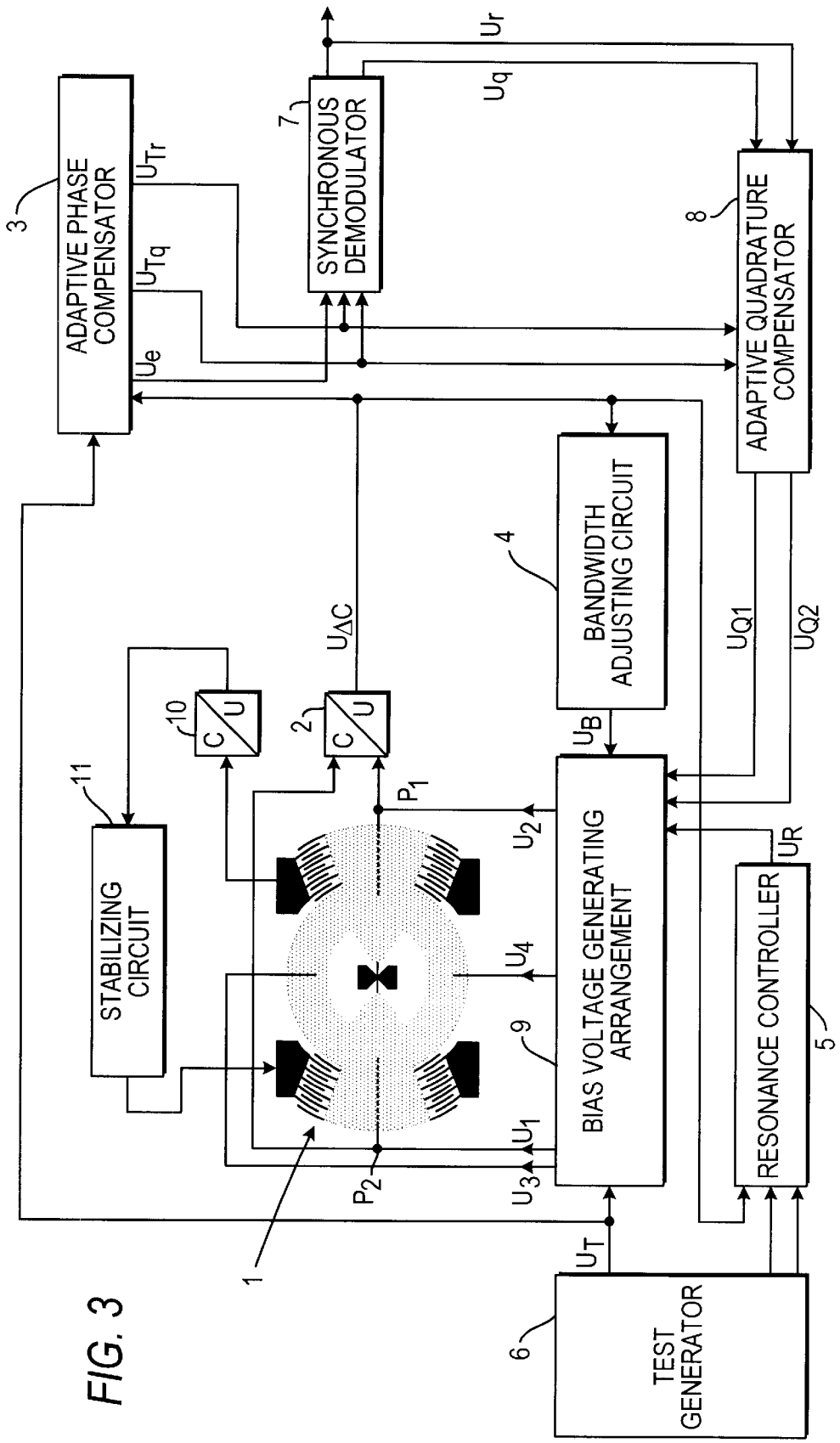
Figure 4:
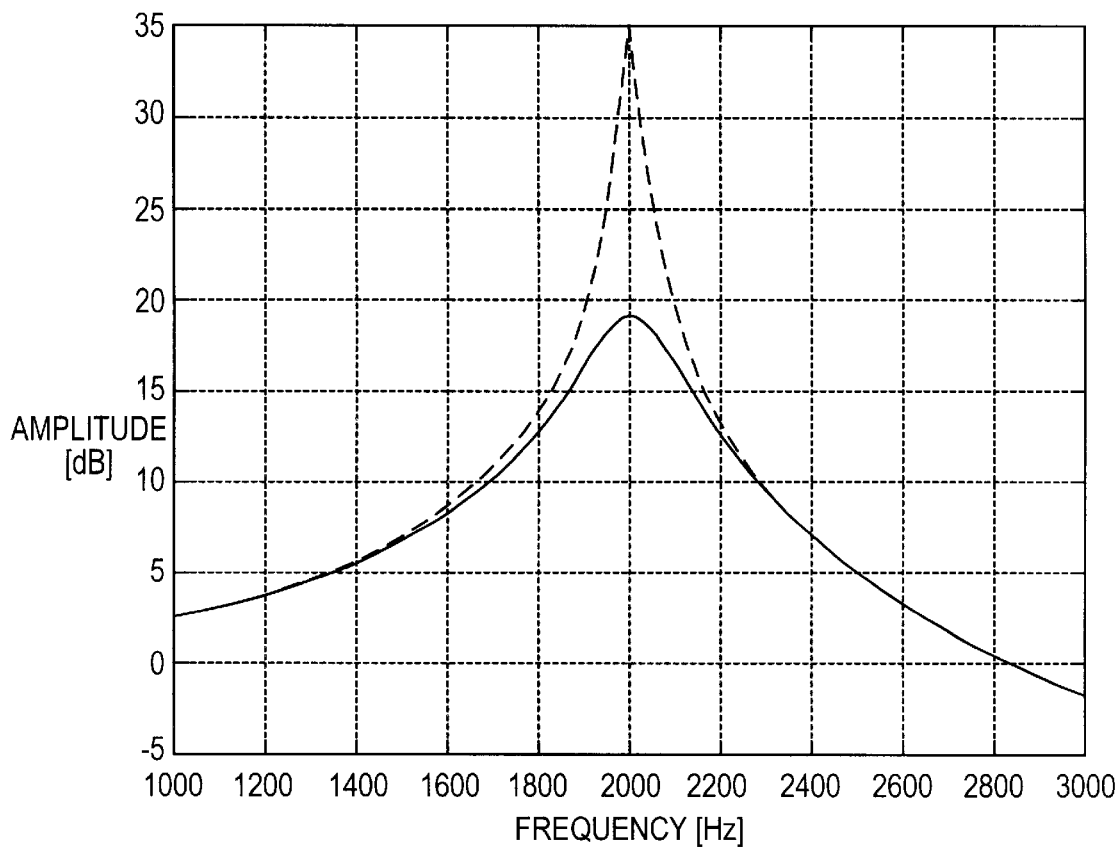

The invention will be described in further detail in the ensuing description, in terms of an exemplary embodiment shown in the drawings. Shown are:

FIG. 1, a sketch to explain the principle of a rotationally vibrating rotation rate sensor;

FIG. 2, a sketch illustrating the electrode structure beneath the seismic mass;

FIG. 3, a block circuit diagram of a device for generating bias voltage for a rotationally vibrating rotation rate sensor; and FIG. 4, a graph illustrating the amplitude frequency response of the detection motion.

DESCRIPTION

FIG. 1 shows a sketch to explain the principle of a rotationally vibrating rotation rate:sensor. A disk-shaped structure is set into rotationally vibrating oscillation about the axis z, which is perpendicular to the chip surface. On the basis of the principle of obtaining angular momentum, this structure reacts to a rotary speed (rotation rate) imposed from outside about the axis y with a torque, which tilts the disklike structure about an axis x perpendicular to the drive motion axis z and perpendicular to the rotation rate axis y. This detection motion about the axis x is detected electrostatically by way of capacitance changes, with the aid of electrodes that are located underneath the structure on the substrate. This arrangement is shown in FIG. 2, which is a sketch illustrating the electrode structure E beneath the seismic mass M of the sensor.

The measurement signal obtained is delivered to a capacitance-voltage converter, at which a signal appears that corresponds to the rotational speed of the drive motion, multiplied by the rotation rate to be measured. In communications terms, this is a two-side band amplitude modulated signal without a carrier. By means of a subsequent signal processing, by means of synchronous demodulation and low-pass filtration, the desired rotation rate signal is obtained.

In actual rotation rate sensors, however, not only the aforementioned rotation-rate-proportional signal, which corresponds to an excitation of the detection motion in phase with the rotational speed of the drive motion, appears at the detection capacitors, but also a signal that excites the detection motion in phase with the amplitude or the acceleration of the drive motion. This is an interference signal, which is present regardless of the rotation rate to be measured, and which is suited to adversely affecting the rotation rate signal evaluation. For instance, it makes the attainable measurement resolution worse. This interference signal is phase-shifted 90° from the measurement signal. In other words, in the electrical pointer diagram it is perpendicular to the measurement signal and is therefore called a quadrature signal.

The reasons for the occurrence of a quadrature signal are essentially imperfections that occur in the manufacture of the micromechanical sensor element.

In accordance with the present invention, the aforementioned quadrature signal is already compensated for in the sensor mechanics. To that end, suitably using a digital adaptive algorithm, electrostatic forces are exerted on the disklike sensor structure, so that a quadrature signal does not occur in the first place, or is at least minimized. As a result, the aforementioned undesired effects of the quadrature signal on the signal evaluation are advantageously avoided as well.

By means of this signal evaluation, the amplitude modulated, rotation-rate-proportional signal that arrives from the capacitance-voltage converter is filtered out of various interference signals. Interference signals can for instance be noise from the mechanics and electronics, but they can also be caused by interfering accelerations. For these reasons and for reasons of enhancing sensitivity, it is advantageous in the detection motion to utilize the resonance of the mechanical structure about the detection axis.

In mechanical structures such as the DRS-MM2 of the present applicant, however, the drive resonance and the detection resonance do not necessarily coincide and furthermore deviate with production variations. A detection resonance regulation is therefore required that forces the detection resonant frequency to the drive resonant frequency. A resonance controller of this kind is described in German Reference DE 199 10 415 already mentioned above.

One problem that occurs in this respect is the bandwidth of the resonance ratio of the detection motion. In structures such as the DRS-MM2, because of the corresponding quality of the detection resonance, this bandwidth is only a few Hz. This would mean a bandwidth of the entire rotation rate measurement of only a few Hz as well. This would be much too little, compared with the 50–100 Hz typically demanded by the specifications. One could indeed increase the gas pressure that surrounds the structure and thus damp the resonance to such an extent that the resonance ratio has a suitable bandwidth. At the same time, then, however the mechanical noise would be increased and the drive resonance would be damped, resulting in a lower measurement resolution and greater required drive voltages. At the same time, the temperature dependency of the measurement sensitivity would be increased. All these effects are extremely undesirable.

The same effect of a suitable damping of the detection resonance can also be attained, however, by means of an electronic bandwidth adjustment. At the same time, this also has advantages with regard to the temperature dependency of the resonance ratio of the detection motion, and hence the sensor sensitivity.

FIG. 3 shows a block circuit diagram of a device for generating bias voltage for a rotationally vibrating rotation rate sensor, which can logically also be employed with a linearly vibrating rotation rate sensor.

The measurement signals, which are preferably capacitance measurement signals, generated by the rotation rate sensor 1 and applied to the circuit points $P_1$ and $P_2$ are delivered to a capacitance-voltage converter 2. At its output, this converter furnishes a signal $U_{AC}$, which corresponds to the rotary speed of the drive motion, multiplied by the rotation rate to be measured.

This signal is delivered to an adaptive phase compensator 3, a bandwidth adjusting circuit 4, and a resonance controller 5.

The adaptive phase compensator 3 has the task of putting the signal $U_T$, generated in a test signal generator 6 and exciting the rotation rate sensor to vibration, into phase with the Coriolis acceleration components contained in the output signal of the capacitance-voltage converter 2. By way of example, this can be done as described in the aforementioned patent application 196 53 021 of the present applicant. The output signal $U_E$ of the phase compensator 3, which is ascertained by the LMS (least mean square) algorithm, is delivered to the synchronous demodulator 7. The synchronous demodulator also receives demodulation carrier signals $U_{Tq}$ and $U_{Tr}$, which are likewise obtained in the adaptive phase compensator by evaluation of the signal $U_T$ of the test signal generator 6 and of the output signal $U_{AC}$ of the capacitance-voltage converter 2.

In the synchronous demodulator 7, by multiplication and ensuing low-pass filtration out of the signal $U_E$ and the demodulation carriers $U_{Tq}$ and $U_{Tr}$, an ascertainment of the desired rotation rate signal $U_r$ and of a quadrature signal $U_q$ is done.

From the rotation rate signal $U_r$ and the quadrature signal $U_q$, by means of the adaptive quadrature compensator 8 to which the demodulation carrier signals $U_{Tq}$ and $U_{Tr}$ ascertained in the adaptive phase compensator 3 are also delivered, control signals $U_{Q1}$ and $U_{Q2}$ are ascertained, which are supplied to the bias voltage generating arrangement 9. These control signals $U_{Q1}$ and $U_{Q2}$ are used in the manner of a digital adaptive algorithm for imposing equal voltage levels on the detection electrodes of the rotation rate sensor. These levels are varied by the adaptive algorithm until such time as the resultant quadrature signal $U_q$ becomes minimal or vanishes entirely. Various algorithms can be used for this purpose, such as the optimizing algorithm by the method of the steepest drop.

In this method, small voltage changes are fed to the electrodes in alternation via $U_{Q1}$ and $U_{Q2}$, and the reaction of the quadrature signal to them is evaluated. If the quadrature decreases, then the same kind of voltage changes continue to be fed to the output signals. If the quadrature increases, voltage changes of opposite polarity are used. At the same time, the magnitude of the voltage change is adapted in accordance with the amount of the remaining quadrature. In this way, a minimum quadrature is arrived at, and in the ideal case the quadrature disappears entirely.

The bias voltage generating arrangement 9 is supplied not only with the aforementioned control voltages $U_{Q1}$ and $U_{Q2}$ but also with further input signals $U_T$, $U_R$ and $U_B$.

The signal $U_T$ is generated in the test signal generator 6. By way of example, this generator uses a frequency $f_t$, which amounts to 100 Hz, and from this generates a test signal $U_T$ with frequency components at $f_s+f_t$ and $f_s-f_t$; $f_s$ describes the natural frequency of an oscillating body. This test signal travels via the bias voltage generating arrangement 9 to reach the rotation rate sensor 1 and also directly reaches the adaptive phase compensator 3—as has already been described above. The signal $U_T$ is also delivered, in the form of its individual components, to the resonance controller 5.

Using these individual components of the signal $U_T$ and the output signal $U_{AC}$ of the capacitance-voltage converter 2, the resonance controller 5 ascertains a control voltage $U_R$, which is made available at the output of the resonance controller 5 and is delivered to the bias voltage generating arrangement 9.

One example of a resonance controller of this kind can be found in DE 199 10 415, already mentioned above, of the present applicant. The ascertained control voltage $U_R$ is supplied to all four electrodes as a common bias voltage. This reduces the effective spring stiffness of the detection motion of the sensor element so far that the operating frequency of the sensor element and the resonant frequency of the detection motion agree. The use of a resonance controller of this kind has the advantage that it is no longer necessary to provide the detection motion as far away as possible from the oscillator frequency. An amplitude error caused by the resonance ratio no longer occurs, since the steady state is maintained stably by means of permanent resonance regulation.

The signal $U_B$ is generated in the bandwidth adjusting circuit 4, which on the input side is supplied with the output signal $U_{AC}$ of the capacitance-voltage converter 2. Consequently, for electronic bandwidth adjustment of the detection motion of the sensor element, a suitable negative feedback of the signal $U_{AC}$ to the sensor element is performed, via the output of the bandwidth adjustment $U_B$ and the bias voltage generation. To that end, a kind of position controller is used, which has a 90° phase-shifted component. For this purpose, $DT_1$, PTD1 and $PIDT_1$ controllers can for instance be considered. However, these controllers are not operated like usual position controllers, because they would unsuitably change the transfer function of the detection motion. Instead, in contrast to otherwise usual position controllers, the controller is placed in the backward branch of the closed control loop, and only quite a specific, comparatively slight loop gain is established, which places the resonance poles in the s plane precisely far enough away from the imaginary axis that the desired bandwidth of the resonance of the detection motion results.

FIG. 4 shows the amplitude frequency response of the detection motionH without bandwidth adjustment (--) and with bandwidth adjustment (-). The amplitude response is referred to the gain at the frequency 0. Lehr's damping measure of the detection motion is assumed as D=0.01, and the operating frequency is 2 KHz. A $DT_1$ controller was used. The higher the original quality of the detection resonance of the sensor element, the more independent does the remaining quality of the sensor element become with bandwidth adjustment, and thus the more independent are the bandwidth and the measurement sensitivity of the entire sensor of changes in the original quality of the sensor element from temperature, aging and gas pressure.

Further advantages of this kind of electronic bandwidth adjustment are that fluctuations in the quality of the detection motion of the sensor element from production variations, aging and temperature are damped. Also, this kind of electronic bandwidth adjustment is simpler to achieve than a mechanical quality adjustment, for example by way of the gas pressure. Once again, the temperature dependency of the measurement sensitivity of the entire sensor is reduced sharply.

The bias voltage generating circuit 9, using the signals delivered to it, generates four bias voltages $U_1$, $U_2$, $U_3$ and $U_4$ for the four electrodes disposed beneath the seismic mass of the rotation rate sensor. This takes place in accordance with the following equations:

$$U_1 = U_B + U_{Q1} + U_T + U_R$$
$$U_2 = -U_B - U_{Q1} - U_T + U_R$$
$$U_3 = U_{Q2} + U_R$$
$$U_4 = -U_{Q2} + U_R.$$

A BITE signal can also be fed in at this point. Linearly oscillating rotation rate sensors, which use only two electrodes, u&only the voltages $U_1$ and $U_2$.

By means of the amplitude stabilizing circuit 11, which via a capacitance-voltage converter 10 is supplied with an input signal derived from the rotation rate sensor 1, an output signal is generated on the basis of which the sensor is set into a rotary vibration at constant amplitude about the z axis that can be seen from FIG. 1 above. The generation of this output signal is done by means of an oscillation circuit with amplitude regulation. As a result, the sensor element vibrates at its natural frequency $f_s$ about the z axis.

What is claimed is:

1. A device for generating bias voltage for a rotationally or linearly vibrating rotation rate sensor, which on an output side furnishes at least one measurement signal from which a rotation rate signal is ascertained by means of an evaluation circuit connected to the rotation rate sensor, and which has an electrode arrangement with at least two electrodes, which are connected to a bias voltage generating arrangement, characterized in that the device has an adaptive quadrature compensator (8), which is connected on an input side to the evaluation circuit (2, 3, 7) and on the output side to the bias voltage generating arrangement (9), wherein an adaptive phase compensator (3) in the evaluation circuit has outputs for a phase-shifted measurement signal ($U_e$) and demodulation carrier signals ($U_{Tq}$, $U_{Tr}$), and wherein the demodulation carrier signals are delivered to the adaptive quadrature compensator (8).

2. The device of claim 1, characterized in that the measurement signal is a capacitance measurement signal, and the evaluation circuit has a capacitance-voltage converter (2).

3. The device of claim 1, characterized in that the evaluation circuit has a synchronous demodulator (7).

4. The device of claim 3, characterized in that the synchronous demodulator (7) has input terminals for the output signals of the adaptive phase compensator (3) as well as two outputs, and the rotation rate signal ($U_r$) can be picked up at one of said two outputs, and a quadrature signal ($U_q$) can be picked up at another of said two outputs.

5. The device of claim 4, characterized in that the adaptive quadrature compensator (8) has one input for the rotation rate signal ($U_r$) and one input for the quadrature signal ($U_q$).

6. The device of claim 5, characterized in that the adaptive quadrature compensator (8), from input signals of said adaptive quadrature compensator (8), by means of a digital, adaptive algorithm generates at least two control signals ($U_{Q1}$, $U_{Q2}$) for the bias voltage generating arrangement (9).

7. The device of claim 6, characterized in that the adaptive quadrature compensator (8) has at least two outputs, at which said adaptive quadrature compensator (8) makes different control signals ($U_{Q1}$, $U_{Q2}$) for the bias voltage generating arrangement (9) available.

8. The device of claim 1, further comprising a resonance controller (5), which on an output side is connected to the bias voltage generating arrangement (9) and is used to generate a resonance regulating signal ($U_R$).

9. The device of claim 2, characterized in that an output signal of the capacitance-voltage converter (2) is delivered to a bandwidth adjusting circuit (4), which on the output side is connected to the bias voltage generating arrangement (9) and is intended for generating a bandwidth adjustment control signal ($U_B$).

10. The device of claim 9, characterized in that the bandwidth adjusting circuit (4) has a position controller with a 90° phase-shifted component that is disposed in a backward branch of a closed control loop.

11. The device of claim 10, characterized in that a loop gain of the position controller is adjusted such that a predetermined bandwidth or quality of the resonance of a detection motion is attained.

12. The advice of claim 11, characterized in that the electrode arrangement has two or four electrodes, and the bias voltage generating arrangement generates bias voltages for the electrodes in accordance with the following equations:

$$U_1 = U_B + U_{Q1} + U_T + U_R$$

$$U_2 = U_B - U_{Q1} - U_T + U_R$$

$$U_3 = U_{Q2} + U_R$$

$$U_4 = -U_{Q2} + U_R,$$

where in the case of two electrodes the voltages $U_1$ and $U_2$ are used, and where $U_T$ is a test signal generated by means of a test generator (6), $U_R$ is the output signal of the resonance controller (5), $U_B$ is the output signal of the bandwidth adjusting circuit (4), and $U_{Q1}$ and $U_{Q2}$ are the output signals of the adaptive quadrature compensator (8).

* * * * *